United States Patent
Bronstein et al.

(10) Patent No.: US 8,712,156 B2
(45) Date of Patent: Apr. 29, 2014

(54) COMPARISON OF VISUAL INFORMATION

(75) Inventors: Alexander Bronstein, Haifa (IL); Michael Bronstein, Lugano (CH)

(73) Assignee: Bronstein Bronstein Kimmel Technologies Ltd., Haifa (IL)

( * ) Notice: Subject to any disclaimer, the term of this patent is extended or adjusted under 35 U.S.C. 154(b) by 433 days.

(21) Appl. No.: 12/987,290

(22) Filed: Jan. 10, 2011

(65) Prior Publication Data
US 2011/0170781 A1   Jul. 14, 2011

Related U.S. Application Data

(60) Provisional application No. 61/293,670, filed on Jan. 10, 2010, provisional application No. 61/381,485, filed on Sep. 10, 2010.

(51) Int. Cl.
*G06K 9/00* (2006.01)
*G06K 1/00* (2006.01)

(52) U.S. Cl.
CPC ............................. *G06K 1/00* (2013.01)
USPC .................................. 382/181; 382/190

(58) Field of Classification Search
USPC ....................................... 382/181, 190
See application file for complete search history.

(56) References Cited

U.S. PATENT DOCUMENTS

| 2002/0101986 A1* | 8/2002 | Roelse ............................ 380/42 |
| 2003/0108242 A1* | 6/2003 | Conant .......................... 382/190 |
| 2008/0118151 A1* | 5/2008 | Bouguet et al. ............... 382/181 |

OTHER PUBLICATIONS

D. Lowe, "Distinctive image features from scale-invariant keypoints", International Journal of Computer Vision, Nov. 2004.
J. Sivic, A. Zisserman, "Video Google: A Text Retrieval Approach to Object Matching in Videos", Proc. International Conference on Computer Vision, Oct. 2003.

* cited by examiner

*Primary Examiner* — Hadi Akhavannik
(74) *Attorney, Agent, or Firm* — Pearl Cohen Zedek Latzer Baratz LLP

(57) ABSTRACT

A method determines similarity of objects depicted in images when the images pertain to different modalities. The method includes obtaining images that depict the objects and that pertain to the different modalities. An embedding function is applied to each of the images. The embedding function is selected from a set of two or more embedding functions, each of the embedding functions corresponding to a modality of the different modalities, the selected embedding function corresponding to the modality of the image to which it is applied. Application of the embedding function maps that image to a representation in a representation space such that when the images are mapped to the representation space, a distance between the representations of the images is indicative of a similarity of their depicted objects. The similarity of the depicted objects is determined based on the location of the corresponding representations in the representation space.

20 Claims, 6 Drawing Sheets

COMPARISON OF VISUAL INFORMATION

CROSS REFERENCE TO RELATED APPLICATIONS

The present invention claims the priority benefit of U.S. provisional patent application No. 61/293,670 filed on Jan. 10, 2010 and of U.S. provisional patent application No. 61/381,485 filed on Sep. 10, 2010, both of which are incorporated in their entirety herein by reference.

FIELD OF THE INVENTION

The present invention relates to image processing, computer vision, and machine learning. More particularly, the present invention relates to comparison of visual information in images.

BACKGROUND OF THE INVENTION

The public availability of large-scale repositories of visual and geometric data, as well as the introduction of such network-based applications as community photo albums, video blogs, social networks, web television, and peer-to-peer networks, pose challenges in representing, indexing, searching, retrieving, and comparing data from such repositories.

A key problem with such applications is determining similarity among visual data. This may be expressed mathematically as computing a distance (metric) between two visual objects (e.g. images or parts thereof or their descriptors, where an image can be a video frame) in an appropriate space.

One of the fundamental problems in computer vision is finding correspondence between two or more images depicting an object from different views. The knowledge of such correspondence allows reconstructing the three-dimensional structure of the depicted scene (known in the literature as shape from stereo problem). The solution of this problem on a large-scale set of images (e.g. millions of public-domain photographs of a city) is extremely computationally challenging.

Since correspondence finding is a computationally-intensive and ill-posed problem, a feature-based approach is often employed. In this approach, the images first undergo the process of feature detection, by which a set of repeatable stable points is detected in each image (ideally, the same in each view of the object). Next, a local image description around each feature point is constructed by means of a feature description algorithm, which tries to provide a local image description invariant to view point and illumination transformations (which can be approximated as an affine transformation of the image). A standard descriptor employed in computer vision literature is the scale-invariant feature transform, or SIFT (D. Lowe, "Distinctive image features from scale-invariant keypoints," International Journal of Computer Vision, 2004). Ideally, given two views of the same object, the extracted features and the corresponding descriptors in two images should be identical, in which case the process is called invariant.

Having the features and the corresponding descriptors, the correspondence between the two images can be found by finding, for each feature point in one image the closest (in the descriptor space) points in the other. This requires computing a distance between the feature descriptors. Typically, some standard distance (e.g. Euclidean metric) is employed. However, such distance fails to capture the true similarity between the descriptors, since the space of descriptors may have a highly non-Euclidean structure. This partially stems from that fact that descriptors are rarely fully invariant to real-world transformations an observed object undergoes. In particular the affine model is just an approximation, and in practice, the image undergoes more complicated transformations that should account for different illumination, lens distortions, and perspective, which are very difficult to model.

Another important application in computer vision is image retrieval: given a query image, find one or more images most similar to the query from a database of images. This application requires computing a global image descriptor, comparing which allows judging the similarity of the underlying images.

Straightforwardly, image retrieval can be extended to video retrieval, by considering a video as a collection of frames.

A particular setting of the image retrieval problem is the problem of copy detection, in which the query image is a modification of an image in the database as a result of editing or some distortion.

A common approach for constructing a global image descriptor is the bag of features paradigm (J. Sivic, A. Zisserman, "Video Google: A Text Retrieval Approach to Object Matching in Videos", Proc. International Conference on Computer Vision, 2003), In this approach, the local feature descriptors obtained by the aforementioned process undergo vector quantization in a set of representative descriptors (called a "visual vocabulary"). This way, each feature descriptor is replaced by the index of the closest descriptor in the visual vocabulary ("visual word"). Counting the occurrence of different visual words in the image, a histogram called a "bag of features" is constructed.

Given two bags of features representations of the query and a database image, their similarity is measured by computing a standard distance (e.g. Euclidean metric) between the bags of features. If invariant local feature descriptors (e.g. SIFT) are used in the construction of the bag of features, such a representation is also invariant. In practice, it is very difficult or impossible to construct a descriptor that will be invariant to a wide class of realistic transformations an image can undergo.

Many computer vision methods that work well in small-scale applications fail in Internet visual data analysis applications.

The complexity of the visual data available may make it difficult to employ model-based approaches. For example, trying to model local feature variations as affine transformations or trying to model the variation of an image copy as a result of its modification or editing is hard or even impossible.

Furthermore, the large amount of data available on the Internet may limit the applicability of many typical approaches to such tasks as pattern recognition and data analysis. For example, there may be tens of millions of video clips available at some video clip sites. Dealing with such large amounts of data may lead to complexity in computation and data storage (e.g., in the image retrieval problem at this scale of data requires computing a distance between millions of images).

Further difficulties arise from data heterogeneity. Internet images of a scene or object may be generated by different people, at different times, at different places, and using different equipment. For example, photographs of a single architectural landmark that were uploaded to a public image repository may have been acquired by different people, using different types of cameras, under different lighting or weather conditions, and in different formats or representations. The result may be a great variability found in Internet image data collections. The diversity of such data may create problems in data fusion, or in searching and comparing images.

An even more challenging case of data heterogeneity is multi-modality. Images of similar objects or scenes may be acquired from multiple modalities. For example, images of an object or scene may be captured using imaging devices that operate in different spectral bands (e.g. infrared, visible, ultraviolet, and narrower spectral bands within the broader spectral regions). In medical applications, a single organ of a body may be imaged using various medical imaging modalities such as computed tomography, ultrasound, positron emission tomography, and magnetic resonance imaging. In photograph repositories, an object or scene (e.g. architectural landmark) may be imaged from different viewing directions or angles, or using devices that distort the image in different ways. Such different images of a single object, scene, or organ may be generated by unrelated physical processes. Thus, a feature that is visible or prominent in one image may not be in another. Each separate image may be characterized by distinct statistical properties, dimensionality, and structure.

A need to determine similarity between such multi-modal visual data may arise in various contexts. For example, such problems as fusing data from different sensors, aligning medical images, and comparing different versions and representations of a single object may require determining such similarity.

In the field of medical imaging, a particularly important application is multi-modal data fusion or alignment. In multi-modal data fusion, two or more sets of medical images (which can be two- or three-dimensional) acquired by different imaging devices (e.g. a positron emission tomography and a computed tomography scanner) or different operation modes of the same device (e.g. such as T1, T2 or proton density imaging in magnetic resonance imaging) are to be aligned together and mapped to the same system of coordinates.

In multi-modal alignment, a transformation (rigid or non-rigid) may be applied to an image in order to make it as similar as possible locally to another image. The local similarity is determined by means of some metric, which in the case of multiple modalities is a multi-modal metric.

In the computer vision and pattern recognition literature, metric or similarity learning methods have been described as a possible alternative to applying standard distance to visual data. Metric learning methods may be used to implicitly discover traits in the data that are both informative and discriminate between object categories, as well as being invariant to natural data variability. A supervised metric learning method may be applied to attempt to infer similarity from a set of labeled examples of an object (e.g. a large number of photographs of a person or structure). A large number or labeled examples may enable construction of a training set of examples with known similarity. In particular, if the data can undergo transformations, generating examples of transformed data may enable learning the invariance of the data under such transformations.

SUMMARY OF THE INVENTION

There is thus provided, in accordance with some embodiments of the present invention, a method for determining similarity of objects depicted in images when the images pertain to different modalities. The method includes: obtaining images that depict the objects and that pertain to the different modalities; applying an embedding function to each of the images, the embedding function selected from a set of two or more embedding functions, each of the embedding functions corresponding to a modality of the different modalities, the selected embedding function corresponding to the modality of the image to which it is applied, so as to map that image to a representation in a representation space such that when the images are mapped to the representation space, a distance between the representations of the images is indicative of a similarity of their depicted objects; and determining the similarity of the depicted objects based on the location of the corresponding representations in the representation space.

Furthermore, in accordance with some embodiments of the present invention, an image of the images is represented by a descriptor selected from a group of descriptors consisting of: a local feature descriptor, a quantized local feature descriptor, and a bag of features.

Furthermore, in accordance with some embodiments of the present invention, an embedding function of the set of embedding functions includes a sign applied to a linear function.

Furthermore, in accordance with some embodiments of the present invention, the representation space includes a space of binary vectors.

Furthermore, in accordance with some embodiments of the present invention, the distance includes a Hamming distance.

Furthermore, in accordance with some embodiments of the present invention, the set of embedding functions is generated by: obtaining a training set of images pertaining to the different modalities, the images depicting objects, and measures of dissimilarity between the objects, calculating a value of a discrepancy criterion for each candidate set of embedding functions from a set of candidate sets of embedding functions, so as to measure the discrepancy between the measures of dissimilarity between the objects in the training set and the distance between representations of the images corresponding to these objects in a representation space created by applying that candidate set of embedding functions to the images of the training set; and selecting the candidate set of embedding functions corresponding to an optimal value of the discrepancy criterion.

Furthermore, in accordance with some embodiments of the present invention, a measure of dissimilarity of the measures of dissimilarity between objects is a function of a distance between the corresponding images.

Furthermore, in accordance with some embodiments of the present invention, the training set includes a plurality of pairs of images, each image of the pair of images pertaining to a modality of the different modalities.

Furthermore, in accordance with some embodiments of the present invention, a measure of dissimilarity of the measures of dissimilarity between objects comprises labeling each pair as either a positive pair or a negative pair.

Furthermore, in accordance with some embodiments of the present invention, each two of the pairs of images that share a common image are organized into a triplet of images.

Furthermore, in accordance with some embodiments of the present invention, in each triplet the first image and the second image is labeled as a positive pair, and the first image and the third image are labeled as a negative pair.

Furthermore, in accordance with some embodiments of the present invention, the value of the discrepancy criterion is determined by a function that is a monotonically increasing function of the distance between representations of images of the positive pairs, and a monotonically decreasing function of the distance between representations of images of the negative pairs.

Furthermore, in accordance with some embodiments of the present invention, the value of the discrepancy criterion includes a margin corresponding to a triplet of said plurality of triplets.

Furthermore, in accordance with some embodiments of the present invention, the images include a first image and a transformed second image resulting from application of a candidate alignment transformation to a second image, the first image depicting a particular object and pertaining to a first modality of the different modalities, the second image depicting the particular object and pertaining to a second modality, the method including evaluating the candidate alignment transformation on the basis of the determined similarity.

There is further provided, in accordance with embodiments of the present invention, a method for determining similarity of objects depicted in images when the images pertain to a single modality. The method includes: generating an embedding function for application to the images so as to map the images to a representation in a representation space such that when the images are mapped to the representation space, a distance between the representations of the images is indicative of a similarity of their depicted objects. The generation includes: obtaining a training set of images depicting objects and measures of dissimilarity between their depicted objects, calculating a value of a discrepancy criterion for each candidate embedding function of a set of candidate embedding functions, the discrepancy criterion indicative of a discrepancy between the distances between representations in a representation space created by that candidate embedding function of those images in the training set that depict similar objects and the distance between representations in the representation space created by that candidate embedding function of those images in the training set that depict dissimilar objects; and selecting the candidate embedding function corresponding to an optimal value of the discrepancy criterion. The method further includes: obtaining images that depict the objects; applying an embedding function to each of the images, so as to map the images to a representation in a representation space such that when the images are mapped to the representation space, a distance between the representations of the images is indicative of a similarity of their depicted objects; and determining the similarity of the depicted objects based on the location of the corresponding representations in the representation space.

Furthermore, in accordance with some embodiments of the present invention, an image of the images is represented by a descriptor selected from a group of descriptors consisting of: a local feature descriptor, a quantized local feature descriptor, and a bag of features.

Furthermore, in accordance with some embodiments of the present invention, the embedding function includes a sign applied to a linear function.

Furthermore, in accordance with some embodiments of the present invention, the representation space includes a space of binary vectors.

Furthermore, in accordance with some embodiments of the present invention, the distance includes a Hamming distance.

Furthermore, in accordance with some embodiments of the present invention, the training set includes a plurality of triplets of images, wherein each triplet includes a positive pair of images and a negative pair of images, the positive pair and the negative pair sharing a common image.

Furthermore, in accordance with some embodiments of the present invention, the value of the discrepancy criterion is determined by a function that is a monotonically increasing function of the distance between representations of images of the positive pairs, and a monotonically decreasing function of the distance between representations of images of the negative pairs.

Furthermore, in accordance with some embodiments of the present invention, the value of the discrepancy criterion includes a margin corresponding to a triplet of said plurality of triplets.

There is further provided, in accordance with some embodiments of the present invention, a data processing system comprising a processing unit in communication with a computer usable medium, wherein the computer usable medium contains a set of instructions. The processing unit is designed to carry out the set of instructions to: obtain images that depict objects and that pertain to different modalities; apply an embedding function to each of a plurality of images that depict objects, the images pertaining to different modalities, the embedding function selected from a set of two or more embedding functions, each of the embedding functions corresponding to a modality of the different modalities, the selected embedding function corresponding to the modality of the image to which it is applied, so as to map that image to a representation in a representation space such that when the images are mapped to the representation space, a distance between the representations of the images is indicative of a similarity of their depicted objects; and determine the similarity of the depicted objects based on the location of the corresponding representations in the representation space.

There is further provided, in accordance with some embodiments of the present invention, a data processing system comprising a processing unit in communication with a computer usable medium, wherein the computer usable medium contains a set of instructions. The processing unit is designed to carry out the set of instructions to: generate an embedding function for application to the images so as to map the images to a representation in a representation space such that when the images are mapped to the representation space, a distance between the representations of the images is indicative of a similarity of their depicted objects. The generation includes: obtaining a training set of images depicting objects and measures of dissimilarity between their depicted objects, calculating a value of a discrepancy criterion for each candidate embedding function of a set of candidate embedding functions, the discrepancy criterion indicative of a discrepancy between the distances between representations in a representation space created by that candidate embedding function of those images in the training set that depict similar objects and the distance between representations in the representation space created by that candidate embedding function of those images in the training set that depict dissimilar objects; and selecting the candidate embedding function corresponding to an optimal value of the discrepancy criterion. The processing unit is further designed to carry out the set of instructions to: obtain images that depict objects; apply an embedding function to each of the images, so as to map the images to a representation in a representation space such that when the images are mapped to the representation space, a distance between the representations of the images is indicative of a similarity of their depicted objects; and determine the similarity of the depicted objects based on the location of the corresponding representations in the representation space.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

Figure 1:
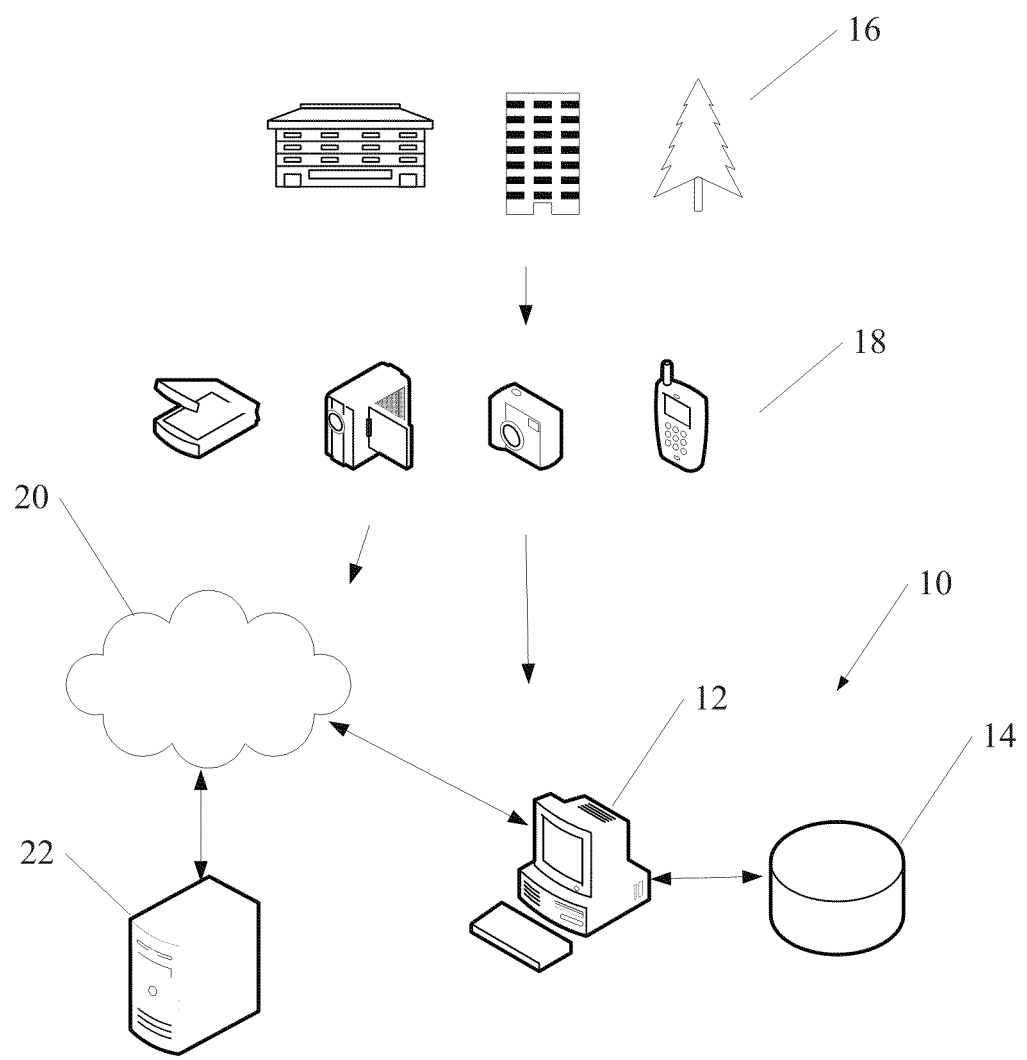
FIG. 1 shows a system for comparison of visual information, in accordance with embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

In accordance with embodiments of the present invention, an image of an object, object feature, or scene (any of which is hereinafter referred to as an object) may be characterized by a modality. For example, an image may have been acquired by an imaging device (e.g. camera, video camera, or scanning device that is sensitive to emitted or reflected electromagnetic radiation, sound waves, or particles) with particular characteristics (e.g. spectral sensitivity or imaging medium) that may affect the appearance of the image.

In this description, visual object is to be understood as referring to an image (such as data in a digital photograph or file, or other computer-readable image data), a frame of a video, or a portion or feature of an image. A visual object may also be understood as referring to a representation of any of the aforementioned by an appropriate descriptor. Representation by a descriptor may depend on the modality. A descriptor may be represented by a point (specified by a vector of coordinates) in a data space (described in more detail below). The structure of the data space, or the coordinates of a particular descriptor in the data space, may depend on the modality. Any type of visual object is hereinafter referred to as an image.

A set of embedding functions may be provided for the purpose of mapping the data space to a representation space (or embedding space). The embedding functions map a visual object (point in the corresponding data space) to a corresponding point in a representation space. Typically, a separate embedding function may be provided for each modality (and possibly for a specific class of objects).

Typically, the representation space is different from the data space. The representation space may provide for a more compact representation of the visual data, e.g. by reducing its dimensionality, or for more efficient computation of distance between the data points.

The mapping of the data space to the representation space may be configured such that points in the representation space that represent images of a single object, even when the images are of different modalities, are close to one another in the representation space. Thus, a distance between points in the representation space may be indicative of a similarity between the corresponding imaged objects.

Thus, a collection of images, such as a database of images, may be mapped to corresponding points in the representation space. When a new image is mapped to a new point in the representation space, the coordinates of the new point may be used to compare the content of (e.g. an object imaged in) the new image to the content of the other images of the collection. For example, other images with similar or identical content may be identified in the collection.

Images of a single object that were acquired by different imaging modalities may have different appearances. For example, if images were acquired by two cameras that are sensitive to different spectral ranges, a feature that is visible in one image (e.g. representing a particular object feature of an imaged object) may not be visible in the other. Other examples are images acquire using various medical imaging techniques (e.g. x-ray imaging, nuclear isotope-based imaging techniques, ultrasound imaging, tomography, magnetic resonance imaging). In addition to different spectral ranges, images acquired under different modalities may include images acquired under other conditions that may affect visibility of features (e.g. different illumination conditions, or under different conditions of distortion).

An image may be quantitatively described with the aid of local or global descriptors. A descriptor may be mathematically represented as a point (vector of coordinates) in an appropriate descriptor space, which may be identified with the aforementioned data space.

A local descriptor may represent local content or a feature in an image. For example, a local feature descriptor may be based on measured intensity gradients in a location of an image that contains a feature of interest. In this case, a local feature descriptor may include a set of numbers that represent the measured image intensity gradients. Typically, the gradients (magnitudes and directions) in a region near a feature (typically, an area of the image surrounding the feature is divided into several such regions) may be represented in the form of a histogram. In this case, each bin of the histogram (of each region) may be represented by a different dimension and axis in the multidimensional (e.g. 128-dimensional) local descriptor space. The contents of each bin of the histogram may be represented by a coordinate value along the axis of the local descriptor space that corresponds to that bin.

Rather than characterizing each feature by an exact coordinate in the local descriptor space, a finite number of feature points may be identified in the local descriptor space. Each feature point may represent a typical image feature. In analogy to text identification techniques, these representative points and their corresponding typical features may be referred to as visual words. A collection of such visual words may be referred to as a visual vocabulary. Thus each feature of an image may be identified with a visual word of the visual vocabulary. For example, if a local descriptor point of a local feature of an image lies in a region of the local descriptor space that is near one of the feature points, that local descriptor point may be considered to coinciding with that feature point. Thus, the local descriptor space may be quantized. Thus all local descriptor points that are quantized to coincide with a feature point may be considered as representing instances of the corresponding typical feature.

Different modalities of images may be typified by different local feature descriptors used. Furthermore, if the local descriptors are quantized, the use of different visual vocabularies may be considered as a different modality.

An image may be globally characterized by its local feature content. For example, where a finite visual vocabulary has been defined, a global histogram may be made of a frequency of occurrence of each of the typical features. Such a histogram representation may be referred to as a bag of features. A bag of features may be considered to typify an image of an object. In comparing two images, the similarity between their respective bags of features may be correlated with a probability of their representing the same, or identical, objects.

The bag of features of an image may be used to define an image point representative of the image in a global descriptor space. For example, each dimension in the global descriptor space may be associated with one of the typical image features, e.g. the total number of dimensions being equal to the number of visual words in the visual vocabulary. The coordinate of an image point in each dimension may correspond to a histogram value associated with that feature in the bag of features representation.

Each modality may be associated with its own global descriptor space. Representing an image in a different global descriptor space (e.g. using a different visual vocabulary) may in itself be considered to constitute a separate modality.

Each modality global descriptor space may be associated with an embedding function. The embedding function may be applied to a point in the global descriptor space in order to map that point to the representation space. The embedding function may be designed such that images of a single object that were acquired using different modalities may be mapped to neighboring points in the representation space.

Alternatively, to a representation space based on images, a local feature representation space and the associated local feature embedding functions may be based on local features. A local feature embedding function may map a feature from a local descriptor space to a corresponding point in a representation space.

The embedding functions may be created by inputting a training set of labeled images. Images may include parts or features of an image that are described by one or more local feature descriptors or quantized local feature descriptors, or by bags of features. The image labels in the training set may indicate which images of the training set represent similar or identical objects, and which do not.

In accordance with some embodiments of the present invention, the training set may be structured as pairs of images. A pair of images of similar or identical objects may be assigned a positive label. A pair of images of dissimilar or different objects may be assigned a negative label.

In accordance with some embodiments of the present invention, the training set may be structured as triplets of images. Each triplet may include a positive pair of images of similar or identical objects, and another negative pair of images of dissimilar or different objects.

In some embodiments of the present invention, the training set may be constructed in such a way to make the representation insensitive to a certain class of image transformations. For example, if a viewpoint-insensitive representation is desired, the training set might contain pairs of local feature descriptors or global descriptors (bags of features) computed from images representing the same object captured from different viewpoints.

The training set may include local feature descriptors or global descriptors (bags of features) computed from images obtained by a physical imaging process. A training set may, in addition, include simulated images obtained by applying a model that simulates class of transformations (e.g. a viewpoint transformation) to one or more images of an object.

The training set may be input to an optimization procedure in order to calculate the embedding functions.

In accordance with some embodiments of the present invention, the representation space may be a space of binary vectors, e.g. a Hamming space. In a space of binary vectors, coordinate values are limited to 0 or 1 (or alternatively, +1 and −1). Every vector in the space of binary vectors can be thus associated with a binary number whose bits correspond to the vector coordinates.

In accordance with some embodiments of the present invention, each embedding function may be the sign of the coordinates of a vector obtained by applying a linear or affine transformation to the coordinates of a point in the data space. This embedding function can be mathematically represented as $\text{sign}(Ax+b)$, where x is the data point, and A is a matrix and b is a vector that may be determined in accordance with an optimization method.

An optimization criterion for generating an embedding function may include a distance in the representation space between points representing images of objects.

In accordance with some embodiments of the invention, the optimization may include attempting to maximize a distance in the representation space between points representing different objects (negatives), while concurrently minimizing a distance between points representing similar or identical objects (positives).

In accordance with some embodiments of the invention, the optimization may include attempting to maximize a margin function. The margin function may represent, for a triplet of images (A, B, C) of which the pair A and B are of the same object (positive) and the pair A and C are of distinct objects (negative), a difference in the distances in the representation space between the representations of the dissimilar objects, on the one hand, and the representations of the similar objects on the other.

The embedding functions may be applied as part of an automated image comparison system to determine a similarity between images. For example, application of the embedding functions to two images may yield two points in the representation space that are close to one another. In this case, an automated system may conclude that there is a high probability that the two images represent a single object. On the other hand, if the points in the representation space are relatively far from one another, the automated system may conclude that there is a small probability that the two images represent a single object. A criterion may be provided (e.g. a threshold distance in the representation space) for determining whether two images represent the same object.

The output of the embedding functions can be used as the input to a classifier constructed to distinguish between certain classes of objects. The classifier may be, for example, a support vector machine. The coordinates of a vector in the representation space that represents an image may be considered to be features, and a feature selection classifier may be applied to them.

FIG. 1 shows a system for retrieval of visual information, in accordance with embodiments of the present invention. Visual information retrieval system 10 may include a processor 12. Processor 12 may include a single computer or two or more intercommunicating computers or other data processing units. Processor 12 may communicate with one or more input/ output devices. Processor 12 may communicate with a data storage device 14. Data storage device 14 may include one or more storage devices that are incorporated into processor 12, or one or more fixed or removable data storage devices with which processor 12 may communicate. Data storage device 14 may be configured to store programmed instructions for the operation of processor 12. Data storage device 14 may be configured to store data used or stored during the operation of visual information retrieval system 10. For example, data storage device 14 may be used to store a database of image representations.

Visual information retrieval system 10 may receive data that represents images of one or more objects 16. Images of an object 16 may be acquired using various image acquisition devices 18. Two or more of image acquisition devices 18 may acquire images of an object 16 using different modalities. An image acquired by an image acquisition device 18 may be transmitted to visual information retrieval system 10. For example, an image acquisition device 18 may be connected to processor 12 or to data storage device 14. Alternatively, an image acquired by an image acquisition device 18 may be stored on a server 22. Visual information retrieval system 10 may access an image stored on server 22 via a network 20.

Figure 2A:
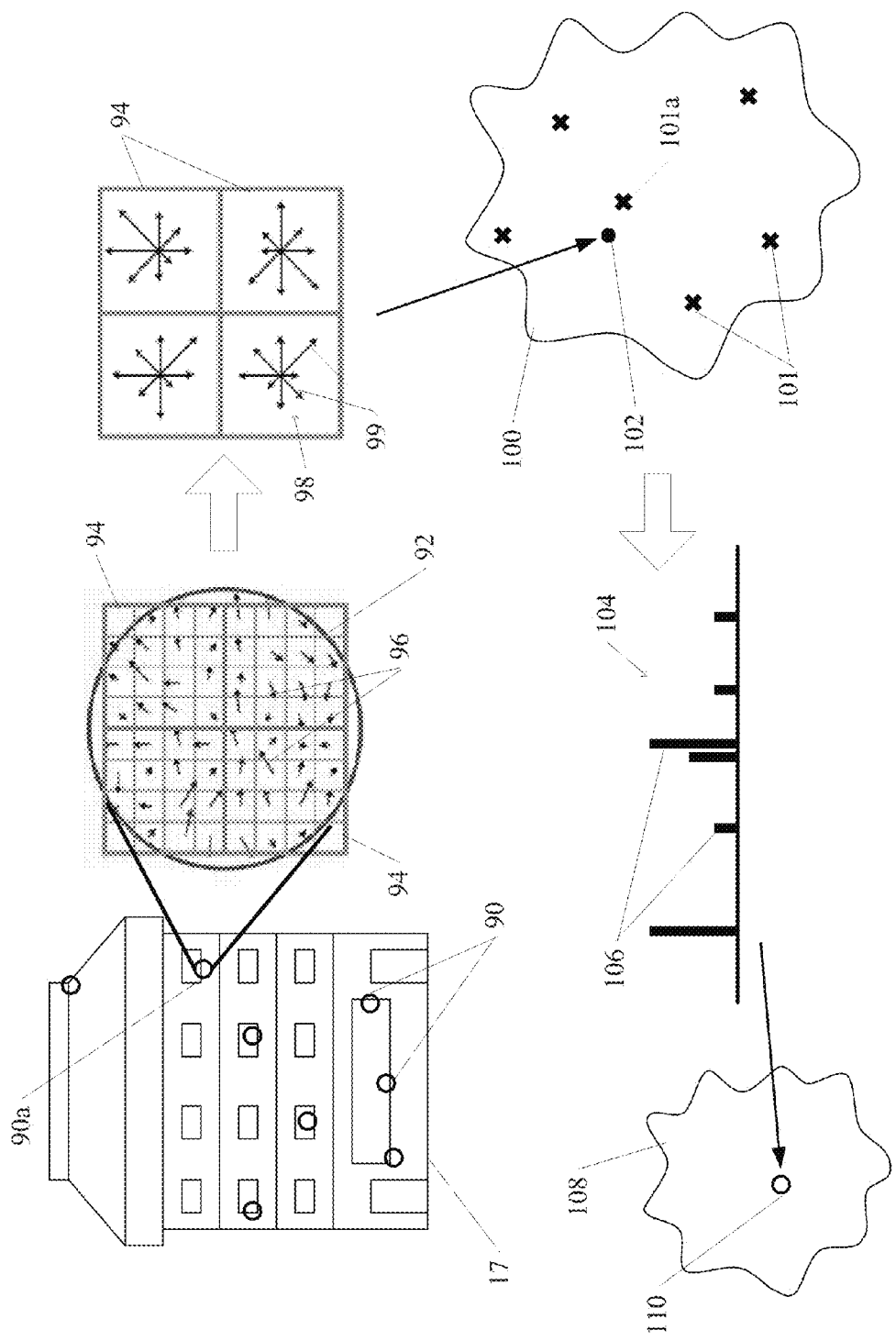
FIG. 2A schematically illustrates generation of an image descriptor for use by embodiments of the present invention.

FIG. 2A schematically illustrates generation of an image descriptor for use by embodiments of the present invention. An image 17 may have been provided as part of a training set, or may be an image provided for comparison with another image. On or more features 90 may be identified in image 17. One or more of features 90, such as feature 90a, may be analyzed in order to construct a local descriptor. For example, feature region 92 of the region surrounding feature 90a may be divided into subregions 94. Intensity values of pixel in each subregion may be analyzed to yield local gradients 96.

In each subregion 94, local gradients 96 may be analyzed to form a gradient histogram 98 for that subregion 94. Each gradient bin 99 (here illustrated by an arrow) of gradient histogram 98 may represent a range of directions of local gradients 96 in the associated subregion 94. The value associated with each gradient bin 99 (here illustrated by a length of the arrow) may be related to a sum of the local gradients in the range of directions associated with that bin.

Each gradient bin 99 associated with each gradient histogram 98 may define a dimension of a local descriptor space 100. Thus, the dimensionality of local descriptor space 100 may be equal to the number of gradient bins 99 in each gradient histogram 98, multiplied by the number of the number of subregions 94 in feature region 92. The coordinates of a descriptor point, such as descriptor point 102 representing feature 90a, may be determined by the values of gradient bins 99.

If local descriptor space 100 is quantized, one or more visual words 101 (each representing a typical feature) may have been defined in local descriptor space 100. Thus, for example, descriptor point 102 may associated with one of visual words 101. In particular, descriptor point 102 may be identified a visual word 101 that is closest to descriptor point 102 in local descriptor space 100, e.g. visual word 101a.

In this manner, each feature 90 of image 17 may be associated with a visual word 101 in local descriptor space 100. Local descriptor space 100 may be analyzed to generate visual vocabulary histogram 104. Each bin 106 of visual vocabulary histogram 104 may represent a visual word 101 in local descriptor space 100. The value of each bin 106 of visual vocabulary histogram 104 may indicate the number of occurrences of each visual word 101 in image 17. The contents of visual vocabulary histogram 104 may define a bag of features for image 17.

Visual vocabulary histogram 104 may be used to define global descriptor point 110 that represents image 17 in a global descriptor space 108. In global descriptor space 108, each dimension may represent a bin 106 of visual vocabulary histogram 104 (or a visual word 101). The coordinate of global descriptor point 110 in each dimension may represent the value of the corresponding bin 106.

Figure 2B:
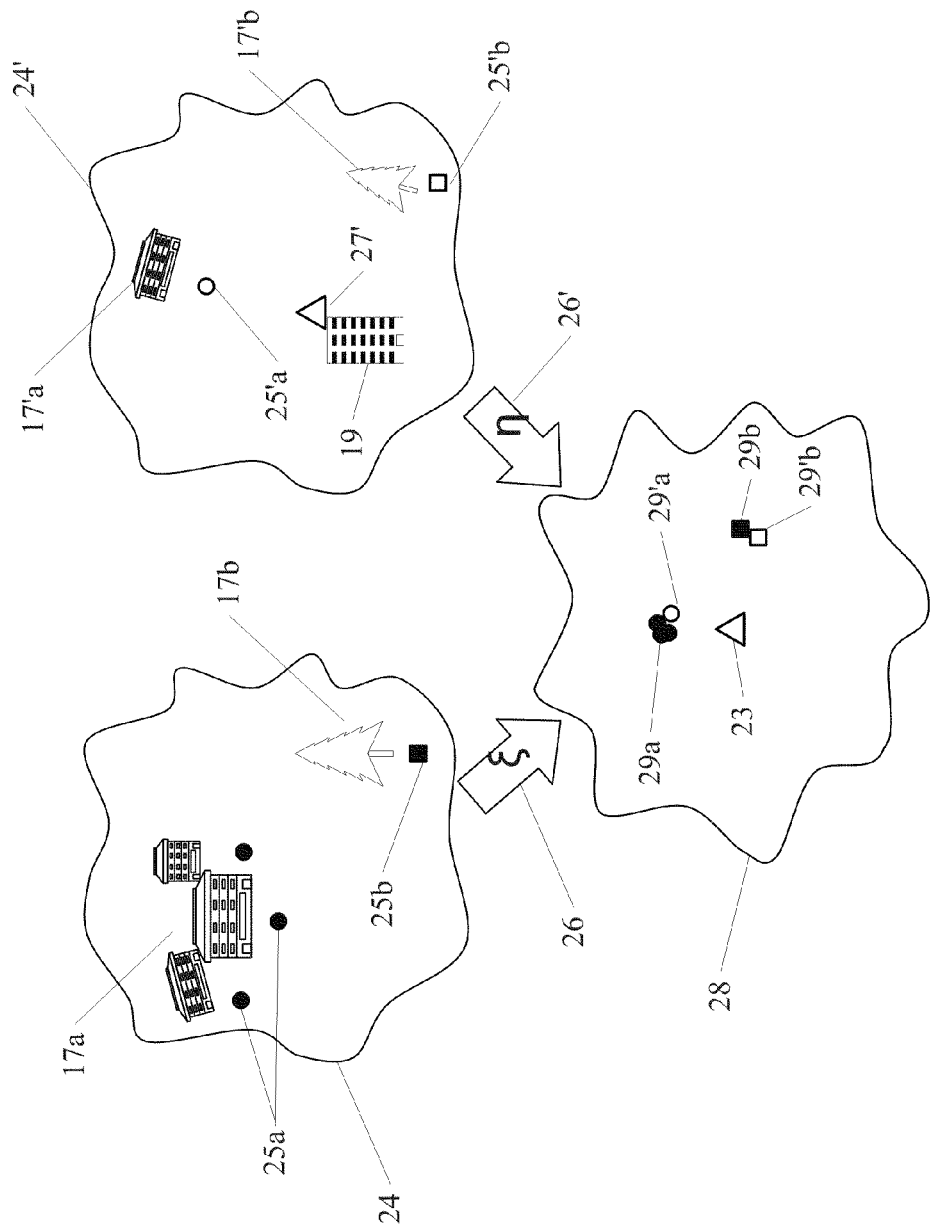
FIG. 2B schematically illustrates comparison of visual information, in accordance with embodiments of the present invention.

FIG. 2B schematically illustrates comparison of visual information, in accordance with embodiments of the present invention. A training set of images may include images 17a of a first object and images 17b of a second object that were acquired with a first modality. Images 17a and 17b may be represented by descriptor points 25a and 25b respectively in the corresponding first modality descriptor space 24 (e.g. such as local descriptor space 100 or global descriptor space 108 of FIG. 2A). Similarly, the training set may include images 17'a of the first object and images 17'b of the second object that were acquired with a second modality. Images 17'a and 17'b may be represented by descriptor points 25'a and 25b respectively in the corresponding second modality descriptor space 24'.

Analysis of the descriptor points of the training set may yield $\xi$, a first embedding function 26 for mapping descriptor points (e.g. descriptor points 25a and 25b) of first descriptor space 24 to points (e.g. representation space points 29a and 29b respectively) of a common representation space 28. Similarly, analysis of the training set may yield $\eta$, a second embedding function 26' for mapping descriptor points (e.g. descriptor points 25'a and 25'b) of second descriptor space 24' to points (e.g. representation space points 29'a and 29'b respectively) of common representation space 28. For example, as schematically illustrated in FIG. 2, representation space points 29a and 29'a, representing images of a single object with different modalities, have been drawn closer to one another than to representation space points 29b and 29'b, which represent images of another object.

Once embedding functions 26 and 26' have been defined, image comparison may be performed. For example, a new image (e.g. image 19 imaged with the second modality and represented by descriptor point 27' in second descriptor space 24') may be mapped using an appropriate embedding function (e.g. second embedding function 26') to representative point 23 in representation space 28. The distance between representative point 23 and other points in the representation space 28 may be calculated (e.g. by calculating a Euclidean distance in the multidimensional representation space 28). The calculated distance may be indicative of a degree of similarity between the imaged object that corresponds to representative point 23 and the imaged objects that correspond to the other points in representation space 28.

Figure 3:
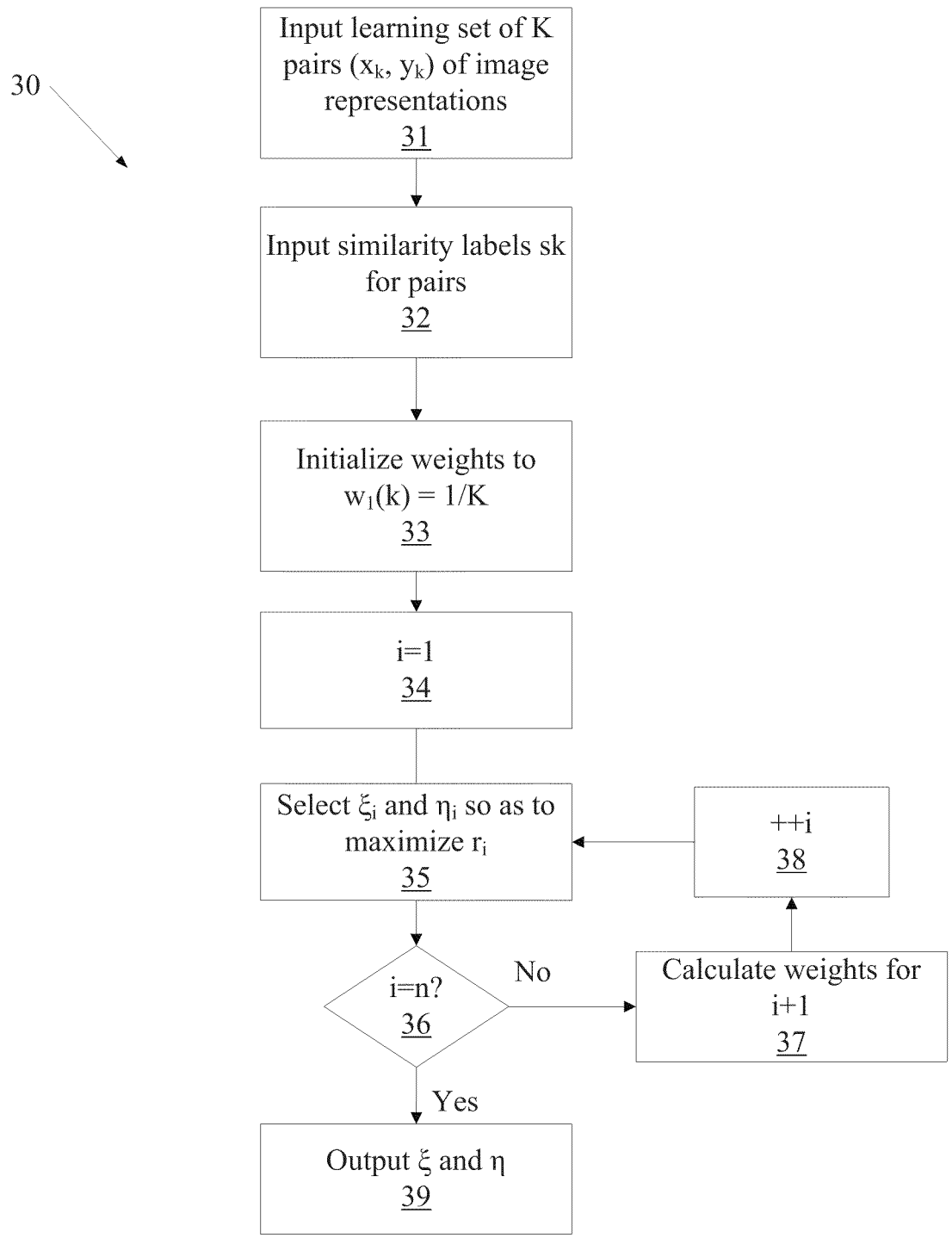
FIG. 3 is a flowchart of a boosted method for generating multimodality embedding functions, in accordance with some embodiments of the present invention.

FIG. 3 is a flowchart of a boosted method for generating multimodality embedding functions, in accordance with some embodiments of the present invention. It should be understood with regard to this flowchart, and to all flowcharts described in connection with this description, that the division of the method into discrete steps is for convenience of the description only. The method may be alternatively divided into steps with equivalent results. All such alternative divisions into steps should be understood as falling within the scope of embodiments of the present invention. The order of the steps in the flowchart is selected for convenience only. Unless stated otherwise, steps of the method may be performed in an alternative order or concurrently with equivalent results. All such reordering of steps of the method should be understood as falling within the scope of the present invention.

Boosted multimodality embedding function generation method 30 includes inputting a training set that includes a set of images (step 31). An image of the training set may refer to an image file, or may refer to a representation of the image in a global descriptor space. Alternatively, an image may be understood as also referring to a local feature of a global image, or to a representation of the local feature in a local descriptor space.

Each image may be characterized, e.g. by coordinates in an appropriate descriptor space. For example, an image acquired using one modality may be represented by a point x in a descriptor space associated with that modality. An image acquired using a second modality may be represented by a point y in a second descriptor space associated with the second modality. Each point x or y may be represented by a vector whose dimensionality is equal to that of its descriptor space.

Let us, for the sake of simplicity, limit the present discussion to two modalities. Let us also, for the sake of simplicity, assume that the training images are input as K pairs, each image of a pair k being acquired by a different modality. An image of pair k acquired with the first modality may be characterized by a point $x_k$ in a corresponding first descriptor space. Similarly, an image of pair k acquired with the second modality may be characterized by a point $y_k$ in a second descriptor space.

Labels for the input images may be input (step 32). The labels may be interpreted to indicate the object that was imaged to form each image. For example, images may be obtained from a source (e.g. an image repository accessible by a network) in which each image is accompanied by an identifying label or description.

In particular, each image pair $(x_k, y_k)$ may be input with an associated similarity value $s_k$. The similarity value may indicate a degree of similarity or dissimilarity between the objects represented by the images $x_k$ and $y_k$. In the case of binary similarity, $s_k$ may have one value (e.g. +1) to indicate similarity ("positive" pair), and another (e.g. −1) to indicate dissimilarity ("negative" pair). Alternatively, $s_k$ may be a function of (e.g. inversely proportional to) a distance or metric between $x_k$ and $y_k$ in an appropriate descriptor space. For example, the metric may be the Earth Mover's metric (Wasserstein metric).

In order to map each point x or y to a representation space, appropriate embedding functions, $\xi(x)$ and $\eta(y)$, must be constructed. Each embedding function $\xi(x)$ and $\eta(y)$ may be represented as a vector of n coordinates $\xi_i(x)$ and $\eta_i(y)$ in the representation space, where n is the number of dimensions in the representation space.

In accordance with some embodiments of the present invention, the representation space may be defined to be a space of binary vectors, e.g. a Hamming space, in which coordinate values are limited to 0 or 1 in each dimension. In this case, $\xi_i(x)$ and $\eta_i(y)$ are limited to values of 0 or 1.

For example, a function $f_i(x)$ may be defined, with $\xi_i(x)$ being determined by the rule: $\xi_i(x)=0$ when $f_i(x)\leq 0$, and $\xi_i(x)=1$ when $f(x)>0$. A similar function $g_i(y)$ and a similar rule may be defined for $\eta_i(y)$. In accordance with some embodiments of the present invention, $f_i(x)$ and $g_i(y)$ may be expressed as a linear functions in the form $f_i(x)=p_i \cdot x + a_i$ and $f_i(y)=q_i \cdot y + b_i$. In the linear expression, $p_i$ and $q_i$ may represent vectors and p·x denotes inner product. The number of components of each vector $p_i$ or $q_i$ is equal to the number of dimensions in the descriptor spaces of points $x_i$ and $y_i$, respectively. The terms $a_i$ and $b_i$ are scalars.

For each dimension i in the representation space, a binary function $h_i(x,y)$ may be constructed such that $h_i(x,y)=1$ if $\xi_i(x)=\eta_i(y)$, and $h_i(x,y)=1$ when $\xi_i(x)\neq\eta(y)$, or $h_i(x, y)=(2\xi_i(x)-1)(2\eta_i(x)-1))$.

With these definitions of $\xi_i(x)$, $\eta_i(y)$, and $h_i(x,y)$, and with $s_k$ defined in accordance with the example above, $s_k \cdot h_i(x_k, y_k)$ may equal +1 for any i where images $x_k$ and $y_k$ represent the same object and are correctly mapped to the same point in the representation space (true positive). Similarly, $s_k \cdot h_i(x_k, y_k)$ may equal +1 when images $x_k$ and $y_k$ represent the different objects and are correctly mapped to different points in the representation space (true negative). On the other hand, $s_k \cdot h_i(x_k, y_k)$ may equal −1 for any where the mapping is incorrect (false positive or false negative). Thus, a mapping that optimally maps images $x_k$ and $y_k$ to the representation space may result in maximizing the $$\text{sum } r_i = \sum_{k=1}^{K} w_i(k) s_k h_i(x_k, y_k),$$

where $w_i(k)$ represents a weighing factor used in a boosted learning algorithm (as further described below—in a special case $w_i(k)=1$). With embedding functions $\xi_i(x)$ and $\eta_i(y)$ expressed in the linear form described above, and defining translated image points $\bar{x}_k$ and $\bar{y}_k$ as image points $x_k$ and $y_k$ translated to coordinate systems that are centered about the means of image points $x_k$ and $y_k$, respectively, $r_i$ may be approximated by the modified $$\text{sum } \hat{r}_i = p_i^T \left( \sum_{k=1}^{K} v_k \bar{x}_k \bar{y}_k^T \right) q_i = p_i^T C q_i,$$

where $v_k = w_i(k) s_k$ and C Denotes the Covariance matrix $$C = \sum_{k=1}^{K} v_k \bar{x}_k \bar{y}_k^T$$

Optimization techniques known in the art may be applied to optimize embedding functions for the training set. For example, functions $f_i(x)$ and $g_i(y)$ (or $p_i$ and $q_i$) may be varied until a maximum value of the sum $r_i$ (or of the modified sum $\hat{r}_i$) is achieved.

For example, boosted multimodality embedding function generation method 30, may proceed as described below.

Initial weight values may be set to $w_1(k)=1/K$ (step 33). The representation space dimension index i may be initialized to 1 (step 34).

For each representation space dimension i, $\xi_i$ and $\eta_i$ may be selected so as to maximize the sum $r_i$, as described above. (step 35). For that purpose, vectors $p_i$ and $q_i$ are selected to be, respectively, the left and the right singular vectors of the matrix C corresponding to its maximal singular value. Once $p_i$ and $q_i$ are calculated, the scalars $a_i$ and $b_i$ can be computed by means of a line search algorithm.

If i is less than n (step 36), the weights for use in next step (i+1) may be calculated (step 37). For example, a scalar value $\alpha_i$ may be calculated based on the value of sum $r_i$, $\alpha_i = \frac{1}{2} \log(1+r) - \frac{1}{2} \log(1-r_i)$. Weight $w_{i+1}(k)$ may be calculated base on $\alpha_i$: $w_{i+1}(k)=w_i(k)e^{-\alpha_i s_k j_i(x_k, y_k)}$. The value of i may be incremented by 1 (step 38), and steps 35 and 36 (and 37 and 38) repeated.

When the loop over i is complete, the optimized embedding functions ξ and η may be output (step 39). The output values of ξ and η may be applied to image comparison (as described below).

Generating an embedding function for mapping an image to a representation space may include application of a margin-optimization learning technique, in accordance with some embodiments of the present invention. For example, a margin may be maximized in order to attain an optimum embedding function.

In a maximum margin maximization learning technique, inputting a training set (e.g. as in step 32) may include inputting pairs of images defined as either images of a single object (positive pairs), or as images of different objects (negative pairs). Optimization of an embedding function based on the input training set (e.g. as in step 34) may include optimizing the distinguishability of positive pairs from negative pairs as mapped in to the representation space. Distinguishability may be considered to be improved when distances in the representation space between images of positive pairs are decreased while distances between images of negative pairs are increased. The distinguishability may be quantified by a margin criterion.

For simplicity of the discussion, we ignore the modality of images of the training set (e.g. assume a single modality for the training set).

Figure 4:
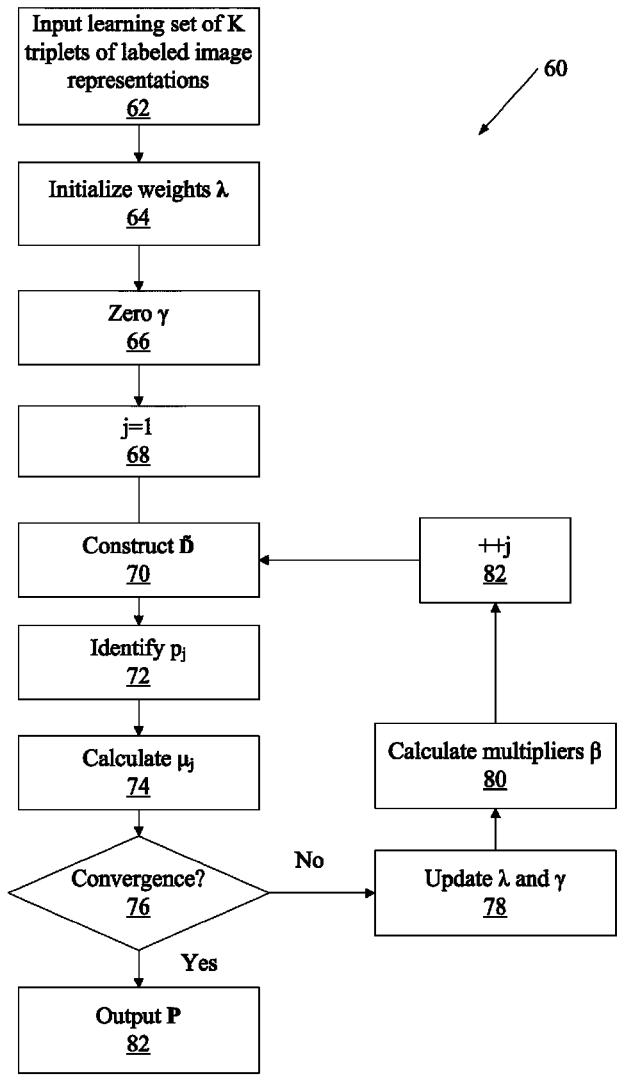
FIG. 4 is a flowchart of a method for application of a maximum margin learning technique in accordance with some embodiments of the present invention.

FIG. 4 is a flowchart of a method for application of a maximum margin learning technique in accordance with some embodiments of the present invention.

Maximum margin learning method 60 may include inputting a training set of K image triplets. Each input image may be designated by coordinates of a point x in an appropriate m-dimensional descriptor space. Thus, a point x may be represented by an m-dimensional vector. Each image triplet, such as image triplet number k, may include a positive pair of images made of a single object, designated $x_k$ and $x^+_k$. In addition, each triplet includes a third image $x^-_k$ of a different object, forming a negative pair with $x_k$ (or with $x^+_k$).

In accordance with some embodiments of the present invention, the embedding function may be expressed as a linear function and the representation space as an n-dimensional space of binary vectors (e.g. a Hamming space). The embedding function (e.g. ξ or η) for mapping an image x to a point z (represented by an n-dimensional vector) in the representation space may be expressed in the form z=sign (Px+t). The projection matrix P may be represented by an m×n matrix, and t by an m-dimensional vector.

A margin for each input triplet may be defined as the distance squared between the mapped points of the negative pair minus the distance squared between the mapped points of the positive pair. Thus, margin $\mu_k$ may be defined for triplet k as:

$$\mu_k = |z_k - z^-_k|^2 - |z_k - z^+_k|^2 = |Px_k - Px^-_k|^2 - |Px_k - Px^+_k|^2.$$

Thus, increasing $\mu_k$ may imply increasing the distinguishability between mapped points of positive pairs and negative pairs. Therefore, optimizing the embedding functions may include finding a projection matrix P such that the $\mu_k$ are maximized.

In accordance with maximum margin learning method 60, components of a K-dimensional weighting vector λ are initialized to 1/K (step 64) and a parameter γ is zeroed (step 66). For each iteration j, starting with iteration 1 (step 68), a matrix D may be constructed in accordance with $$D = \sum_{k=1}^{K} \lambda_k D_k.$$

The largest eigenvector of D may be found and identified as $p_j$ (step 72). The value of the margin $\mu_j$ at this stage may be calculated as $\mu_j = P_j^T D_1 q_i, \ldots, P_j^T D_K q_i)^T$, where $D_k = (x_k - x^-_k)(x_k - x^-_k)^T - (x_k - x^+_k)(x_k - x^+_k)^T$.

The algorithm may now be tested for convergence (step 76). For example, a convergence criterion may be expressed as $\lambda^T \mu_j + \gamma \leq \epsilon$, where ϵ represents a convergence threshold (typically having a zero value or a small positive value set empirically to optimize the tradeoff between the dimensionality of the representation space and the accuracy of the embedding).

If the convergence criterion has not been met, the values of λ and γ may be updated for the next iteration (step 78). For example, updated values may follow from solving the dual linear problem max γ such that $\lambda^T \mu_j + \gamma \leq 0$, $0 \leq \lambda \leq 1$, $1^T = 1$. The set of coefficients $(\beta_i, \ldots, \beta_j)$ is defined to be the Lagrange multipliers of the latter problem (step 80). The index j may then be incremented by 1 (step 82), and steps 70 through 76 may be repeated.

If convergence is indicated, P may be calculated as $P=(\sqrt{\beta_1}p_1, \ldots, \sqrt{\beta_j}p_j)^T$, where $(\beta_1, \ldots, \beta_j)$ are the last calculated Lagrange multipliers.

A modified maximum margin learning method may also be applied to a training set with multiple modalities in order to generate embedding functions for the different modalities. For example, for two modalities, a training set of images may include triplets of images of both modalities in the form $(x_k, y^+_k, y^-_k)$. Each triplet k may include an image $x_k$ of one modality A, an image $y^+_k$ of a second modality B forming a positive pair with $x_k$, and an image $y^-_k$ of modality B forming a negative pair with $x_k$.

For the purpose of the calculation, an image of modality B may be represented in a descriptor space representing modality A by means of a translation function t. The translation function may be realized by a linear map represented by a matrix T. Matrix T may be selected so as to minimize a cost function expressed by the expression:

$$\sum_{k=1}^{K} \|P(x_k - Ty^+_k)\|^2 + c\sum_{k=1}^{K} \|h(1 - \mu_k)\|^2,$$

where h(t)=max(t,0), $\mu_k = \|P(x_k - Ty^-_k)\|^2 - \|P(x_k - Ty^+_k)\|^2$ is the margin for the training triplet k, and c is a Lagrange multiplier. The Lagrange multiplier may be selected so as to limit the number of training triplets having a negative margin to a certain predefined maximum ratio. The matrix T may be found by performing gradient descent minimization, conjugate gradient minimization, Newton or quasi-Newton minimization, or any other similar procedure known in the art.

In some embodiments of the invention, optimization over matrices P and T may be alternated. For example, several iterations of a gradient descent minimization procedure may be performed to find matrix T while matrix P is kept fixed. Then, matrix T may be fixed and P may be found by performing several iterations of single-modality maximum margin learning algorithm 60. Both matrices may be initialized at the beginning of the optimization to unit matrices.

A set of embedding functions may be applied so as to compare images to one another.

Figure 5:
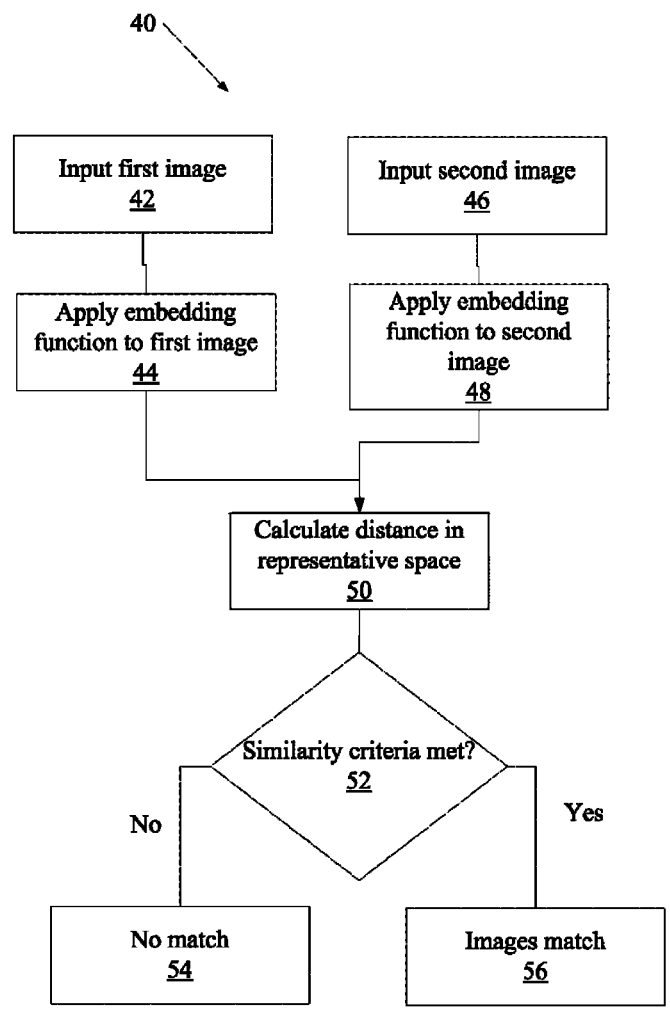
FIG. 5 is a flowchart of image comparison in accordance with embodiments of the present invention.

FIG. 5 is a flowchart of image comparison in accordance with embodiments of the present invention. A first image that was acquired using a first imaging modality may be input (step 42). For example, the first image, or a feature of the first image, may be defined as a point in an appropriate descriptor space. An embedding function appropriate to the first imaging modality may be applied to the first image so as to map the first image to a first mapped point in a representation space (step 44).

A second image that was acquired using a second imaging modality may also be input (step 46). The second imaging modality may be identical to the first imaging modality, or may be different. The second image may also be defined as point of an appropriate descriptor space. An embedding function appropriate to the second imaging modality may be applied to the second image so as to map the second image to a second mapped point in the same representation space as the first image (step 48).

Typically, the second image may be input in order to compare to the first image. For example, the second image may represent one or more images of a group of images, such as an image database or repository, or a network application. In this case, the second image may have been previously mapped to the representation space. For example, a database of images may include a field that includes coordinates of the image in the representation space.

For example, an image repository may be searched for images that are comparable to the first image. Applications of such a search may include copyright enforcement, or cross-modality comparison of images (e.g. for medical imaging or security purposes).

The distance in the representation space between the first and second mapped points corresponding to the first and second images may be calculated (step 50). For example, a Euclidean distance in the representation space may be calculated. Typically, the distance between the first and second mapped points may be indicative of a degree of similarity between the first and second images.

The calculated distance in the representation space may be compared to a similarity criterion (step 52). For example, a similarity criterion may include a maximum distance in the representation space.

If the similarity criterion is not met (e.g. the calculated distance is greater than a maximum distance), then the images are assumed to be different from one another (step 54). For example, the images may be assumed to show different objects. On the other hand, if the similarity criterion is met (e.g. the distance is less than the maximum distance), the images may be assumed to show similar or identical content (step 56).

As another example, a database may include coordinates of mapped points of images in the representation space. The first mapped point corresponding to the first image may be used to query the database. An appropriately configured database program may return images whose corresponding mapped points lie within a predetermined (e.g. entered as part of the query) distance of the first mapped point. The content of the returned images may be assumed to be similar to the content of the first image.

Image comparison in accordance with some embodiments of the present invention may be applied to check alignment between images of different modalities.

Image comparison in accordance with some embodiments of the present invention may be applied to multimodal image alignment. For example, given two input images of modality A and B, each image may be decomposed into local patches.

A distance between a pair of two corresponding local patches of the two images may be computed according to embodiments of the present invention. Appropriate embedding functions may be applied to the pair of local patches so as to map into points of a single representation space. Calculating the distance between the points may indicate a dissimilarity between the two local patches. Analysis of distances between pairs of corresponding local patches may indicate a quality of image alignment. For example, when alignment is good, all the corresponding pairs of local patches should be indicated as being similar.

If dissimilarity is indicated, (e.g. corresponding local patches are mapped to points that at far from one another in the representation space), a candidate alignment transformation may be applied to one of the images, e.g. the image of modality A. Application of the candidate alignment transformation to the image of modality A may transform the image of modality A for the purpose of making the local patches of the resulting transformed image more similar to corresponding patches of the image of modality B.

An appropriate alignment transformation may be selected from a set of candidate alignment transformations by application of an iterative optimization procedure. In the iterative optimization procedure, image comparison in accordance with embodiments of the present invention may be applied to evaluate the quality of each candidate alignment transformation.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for determining similarity of objects depicted in images when the images pertain to different modalities, the method comprising:
  obtaining images that depict the objects and that pertain to the different modalities;
  applying an embedding function to each of the images, the embedding function selected from a set of two or more embedding functions, each of the embedding functions corresponding to a modality of the different modalities, the selected embedding function corresponding to the modality of the image to which it is applied, so as to map that image to a representation in a representation space such that when the images are mapped to the representation space, a distance between the representations of the images is indicative of a similarity of their depicted objects, the set of embedding functions being by:
    obtaining a training set of images pertaining to the different modalities, the images depicting objects, and measures dissimilarity between the objects,
    calculating a value of a discrepancy criterion for each candidate set of embedding functions from a set of candidate sets of embedding functions, so as to measure the discrepancy between the measures of dissimilarity between the objects in the training set and the distance between representations of the images corresponding to these objects in a representation space created by applying that candidate set of embedding functions to the images of the training set, and selecting as the set of embedding functions the candidate set of embedding functions corresponding to an optimal value of the discrepancy criterion; and determining the similarity of the depicted objects based on the location of the corresponding representations in the representation space.

2. A method as claimed in claim 1, wherein an image of the images is represented by a descriptor selected from a group of descriptors consisting of: a local feature descriptor, a quantized local feature descriptor, and a bag of features.

3. A method as claimed in claim 1, wherein an embedding function of the set of embedding functions comprises a sign applied to a linear function.

4. A method as claimed in claim 1, wherein the representation space comprises a space of binary vectors.

5. A method as claimed in claim 4, wherein the distance comprises the Hamming distance.

6. A method as claimed in claim 1, wherein a measure of dissimilarity of the measures of dissimilarity between objects is a function of a distance between the corresponding images.

7. A method as claimed in claim 1, wherein the training set comprises a plurality of pairs of images, each image of the pair of images pertaining to a modality of the different modalities.

8. A method as claimed in claim 7, wherein a measure of dissimilarity of the measures of dissimilarity between objects comprises labeling each pair as either a positive pair or a negative pair.

9. A method as claimed in claim 7, wherein each two pairs of said plurality of pairs of images that share a common image are organized into a triplet of images.

10. A method as claimed in claim 9, wherein in each triplet the first image and the second image is labeled as a positive pair, and the first image and the third image are labeled as a negative pair.

11. A method as claimed in claim 10, wherein the value of the discrepancy criterion is determined by a function that is a monotonically increasing function of the distance between representations of images of the positive pairs, and a monotonically decreasing function of the distance between representations of images of the negative pairs.

12. A method as claimed in claim 11, wherein the value of the discrepancy criterion comprises a margin corresponding to a triplet of said plurality of triplets.

13. A method for determining similarity of objects depicted in images when the images pertain to different modalities, the method comprising:

obtaining images that depict the objects and that pertain to the different modalities, wherein the images comprise a first image and a transformed second image resulting from application of a candidate alignment transformation to a second image, the first image depicting a particular object and pertaining to a first modality of the different modalities, the second image depicting the particular object and pertaining to a second modality;

applying an embedding function to each of the images, the embedding function selected from a set of two or more embedding functions, each of the embedding functions corresponding to a modality of the different modalities, the selected embedding function corresponding to the modality of the image to which it is applied, so as to map that image to a representation in a representation space such that when the images are mapped to the representation space, a distance between the representations of the images is indicative of a similarity of their depicted objects;

determining the similarity of the depicted objects based on the location of the corresponding representations in the representation space; and evaluating the candidate alignment transformation on the basis of the determined similarity.

14. A method for determining similarity of objects depicted in images when the images pertain to a single modality, the method comprising:

generating an embedding function for application to the images so as to map the images to a representation in a representation space such that when the images are mapped to the representation space, a distance between the representations of the images is indicative of a similarity of their depicted objects; the generation comprising:

obtaining a training set of images depicting objects and measures of dissimilarity between their depicted objects, the training set including a plurality of triplets of images, wherein each triplet includes a positive pair of images and a negative pair of images, the positive pair and the negative pair sharing a common image;

calculating a value of a discrepancy criterion for each candidate embedding function of a set of candidate embedding functions, the discrepancy criterion indicative of a discrepancy between the distances between representations in a representation space created by that candidate embedding function of those images in the training set that depict similar objects and the distance between representations in the representation space created by that candidate embedding function of those images in the training set that depict dissimilar objects, and selecting the candidate embedding function corresponding to an optimal value of the discrepancy criterion;

obtaining images that depict the objects;

applying an embedding function to each of the images, so as to map the images to a representation in a representation space such that when the images are mapped to the representation space, a distance between the representations of the images is indicative of a similarity of their depicted objects; and determining the similarity of the depicted objects based on the location of the corresponding representations in the representation space.

15. A method as claimed in claim 14, wherein an image of the images is represented by a descriptor selected from a group of descriptors consisting of: a local feature descriptor, a quantized local feature descriptor, and a bag of features.

16. A method as claimed in claim 14, wherein the embedding function comprises a sign applied to a linear function.

17. A method as claimed in claim 14, wherein the representation space comprises a space of binary vectors.

18. A method as claimed in claim 17, wherein the distance comprises the Hamming distance.

19. A method as claimed in claim 14, wherein the value of the discrepancy criterion is determined by a function that is a monotonically increasing function of the distance between representations of images of the positive pairs, and a monotonically decreasing function of the distance between representations of images of the negative pairs.

20. A method as claimed in claim 19, wherein the value of the discrepancy criterion comprises a margin corresponding to a triplet of said plurality of triplets.

* * * * *